United States Patent
Fradkin

(10) Patent No.: US 11,226,802 B2
(45) Date of Patent: *Jan. 18, 2022

(54) MANAGING INSTALLATION OF APPLICATIONS ON A COMPUTING DEVICE

(71) Applicant: Avecto Limited, Manchester (GB)

(72) Inventor: Simon Jonathan Fradkin, Gatley (GB)

(73) Assignee: Avecto Limited, Manchester (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/183,742

(22) Filed: Feb. 24, 2021

(65) Prior Publication Data

US 2021/0182045 A1 Jun. 17, 2021

Related U.S. Application Data

(63) Continuation of application No. 16/858,105, filed on Apr. 24, 2020, now Pat. No. 10,963,237, which is a (Continued)

(30) Foreign Application Priority Data

Sep. 1, 2017 (GB) ..................................... 1714048

(51) Int. Cl.
*G06F 8/61* (2018.01)
*G06F 16/11* (2019.01)
(Continued)

(52) U.S. Cl.
CPC .............. *G06F 8/63* (2013.01); *G06F 16/122* (2019.01); *G06F 21/31* (2013.01); *G06F 21/604* (2013.01)

(58) Field of Classification Search
USPC ......................................................... 717/174
See application file for complete search history.

(56) References Cited

U.S. PATENT DOCUMENTS

| 5,881,225 A | 3/1999 | Worth |
| 5,991,542 A | 11/1999 | Han et al. |

(Continued)

FOREIGN PATENT DOCUMENTS

| EP | 2750035 A1 | 7/2014 |
| GB | 2486528 B | 9/2016 |

(Continued)

OTHER PUBLICATIONS

Chris Hoffman and Justin Pot; "How to Install Applications On a Mac: Everything You Need to Know"; HowToGeek.com website [full url in ref.]; Jul. 20, 2017 (Year: 2017).*

(Continued)

*Primary Examiner* — Qing Chen
*Assistant Examiner* — Clint Thatcher
(74) *Attorney, Agent, or Firm* — Morris, Manning & Martin, LLP; Daniel E. Sineway; Adam J. Thompson

(57) ABSTRACT

A computing device can manage installation of an application program using an agent registered with an operating system. The agent can receive a notification in response to a user request to mount a disk image. The disk image can include the application program. The agent can generate a challenge-response to authenticate a current user. An action to take can be determined based on the challenge-response. The application program can be installed using privileges of the agent without changing privileges of an account for the current user.

20 Claims, 5 Drawing Sheets

Related U.S. Application Data continuation of application No. 16/177,833, filed on Nov. 1, 2018, now Pat. No. 10,646,855.

(51) Int. Cl.
*G06F 21/31* (2013.01)
*G06F 21/60* (2013.01)

(56) References Cited

U.S. PATENT DOCUMENTS

| | | |
|---|---|---|
| 6,233,618 B1 | 5/2001 | Shannon |
| 7,133,904 B1 | 11/2006 | Soyha et al. |
| 7,219,354 B1 | 5/2007 | Huang et al. |
| 8,368,640 B2 | 2/2013 | Dardinski et al. |
| 9,158,662 B1 | 10/2015 | Hanes et al. |
| 9,769,131 B1 | 9/2017 | Hartley |
| 10,803,499 B1 | 10/2020 | Davis et al. |
| 2002/0144137 A1 | 10/2002 | Harrah et al. |
| 2002/0174256 A1 | 11/2002 | Bonilla et al. |
| 2004/0078641 A1* | 4/2004 | Fleischmann ....... G06F 11/1469 714/6.12 |
| 2004/0210771 A1 | 10/2004 | Wood et al. |
| 2005/0188370 A1 | 8/2005 | Kouznetsov et al. |
| 2006/0089834 A1 | 4/2006 | Mowatt et al. |
| 2007/0180502 A1 | 8/2007 | Yadav et al. |
| 2007/0198933 A1 | 8/2007 | van der Bogert et al. |
| 2008/0060051 A1 | 3/2008 | Lim |
| 2008/0289026 A1 | 11/2008 | Abzarian et al. |
| 2009/0070442 A1 | 3/2009 | Kacin et al. |
| 2010/0274366 A1 | 10/2010 | Fata et al. |
| 2011/0030045 A1 | 2/2011 | Beauregard et al. |
| 2011/0173251 A1 | 7/2011 | Sandhu et al. |
| 2011/0196842 A1 | 8/2011 | Timashev et al. |
| 2011/0239288 A1 | 9/2011 | Cross et al. |
| 2011/0251992 A1 | 10/2011 | Bethlehem |
| 2012/0047259 A1 | 2/2012 | Krasser et al. |
| 2012/0054744 A1 | 3/2012 | Singh et al. |
| 2012/0066512 A1 | 3/2012 | Kass et al. |
| 2012/0226742 A1 | 9/2012 | Mornchilov et al. |
| 2013/0057561 A1 | 3/2013 | Nave et al. |
| 2013/0339313 A1 | 12/2013 | Blaine et al. |
| 2014/0279600 A1 | 9/2014 | Chait |
| 2014/0281528 A1 | 9/2014 | Dubey et al. |
| 2015/0040181 A1 | 2/2015 | Cook et al. |
| 2015/0058839 A1 | 2/2015 | Madanapalli et al. |
| 2015/0074828 A1 | 3/2015 | Beauregard et al. |
| 2015/0128250 A1 | 5/2015 | Lee et al. |
| 2016/0203313 A1 | 7/2016 | El-Moussa et al. |
| 2016/0217159 A1 | 7/2016 | Dahan et al. |
| 2016/0371105 A1* | 12/2016 | Sieffert ............... G06F 9/45558 |
| 2016/0378962 A1 | 12/2016 | Austin |
| 2017/0011220 A1 | 1/2017 | Efremov et al. |
| 2017/0048259 A1 | 2/2017 | Dodge et al. |
| 2017/0054760 A1 | 2/2017 | Barton et al. |
| 2017/0111368 A1 | 4/2017 | Hibbert et al. |
| 2018/0024895 A1 | 1/2018 | Kumarasamy et al. |
| 2018/0278478 A1* | 9/2018 | Prasad ............... H04L 41/0893 |
| 2018/0302409 A1 | 10/2018 | Hope |
| 2019/0121631 A1 | 4/2019 | Hua et al. |

FOREIGN PATENT DOCUMENTS

| | | |
|---|---|---|
| GB | 2538518 A | 11/2016 |
| GB | 2563066 A | 12/2018 |
| KR | 101308859 B1 | 9/2013 |
| WO | 2006101549 A2 | 9/2006 |
| WO | 2007089786 A2 | 8/2007 |
| WO | 2015183493 A1 | 12/2015 |
| WO | 2018174990 A1 | 9/2018 |

OTHER PUBLICATIONS

Chris Hoffman; "How to Disable System Integrity Protection on a Mac (and Why You Shouldn't)"; HowToGeek.com website [full url in ref.]; Jul. 5, 2017 (Year: 2017).*
Examination Report dated Apr. 29, 2020 for United Kingdom Patent Application No. GB1715628.2.
Examination Report dated Jun. 14, 2019 for United Kingdom Patent Application No. GB1600738.7.
Combined Examination & Search Report dated Feb. 6, 2018 for United Kingdom Patent Application No. GB1714489.0.
Combined Examination & Search Report dated Aug. 1, 2018 for United Kingdom Patent Application No. GB1802241.8.
Combined Examination & Search Report dated Nov. 16, 2018 for United Kingdom Patent Application No. GB1808380.8.
Combined Examination & Search Report dated Mar. 6, 2019 for United Kingdom Patent Application No. GB1814798.3.
Combined Examination & Search Report dated Dec. 1, 2017 for United Kingdom Patent Application No. GB1708824.6.

* cited by examiner

MANAGING INSTALLATION OF APPLICATIONS ON A COMPUTING DEVICE

CROSS-REFERENCE TO RELATED APPLICATIONS

This application is a continuation of U.S. patent application Ser. No. 16/858,105, filed Apr. 24, 2020, and entitled "MANAGING INSTALLATION OF APPLICATIONS ON A COMPUTING DEVICE," which is a continuation of U.S. patent application Ser. No. 16/117,833, filed Aug. 30, 2018, and entitled "MANAGING INSTALLATION OF APPLICATIONS ON A COMPUTING DEVICE," which claims priority from G.B. Application No. 1714048.4, filed Sep. 1, 2017, the disclosure of which are each incorporated herein by reference in their entireties.

TECHNICAL BACKGROUND

The present invention relates generally to the field of computers and computing devices. More particularly, the present invention relates to a computing device and to a method of managing the installation of applications on a computing device.

BACKGROUND

It is desirable to implement a least-privilege access security model, whereby each user is granted only a minimal set of access privileges by way of their standard user account. This model is useful, for example, to reduce the risk of attacks from malicious software (malware).

A difficulty arises in that a relatively high privilege level, such as an administrator-level, is normally required in order to successfully install a new application. Hence, there is a need to provide a mechanism for installing the application, this mechanism being operable by a user account that does not have appropriate administrator privileges.

Another difficulty arises in that the mechanism should be appropriate for a large group of users with widely diverse skills. Ordinary users often have difficulty in correctly operating their computing device to install a new application correctly and safely, or else require a high degree of training and support.

The example embodiments have been provided with a view to addressing at least some of the difficulties that are encountered in current computer systems, whether those difficulties have been specifically mentioned above or will otherwise be appreciated from the discussion herein.

SUMMARY

According to the present invention, there is provided a computer system, a computer-implemented method and a computer-readable storage medium as set forth in the appended claims. Additional features will be apparent from the dependent claims, and the description herein.

There now follows a summary of various aspects and advantages according to certain embodiments. This summary is provided as an introduction to assist those skilled in the art to more rapidly assimilate the detailed discussion herein and is not intended in any way to limit the scope of the claims that are appended hereto.

In one example, a user account that does not have administrator privileges may request mounting of a disk image prior to installing a new application. An agent, which is registered with the operating system, receives a notification and determines whether or not to allow mounting of the disk image. If so, the agent causes the disk image to be mounted by the operating system. The agent then examines the mounted disk image to detect an application bundle. The agent determines whether or not to proceed with the installation of the application bundle and, if so, then causes the application bundle to be copied to a privileged system location, thereby installing the application on the computing device.

In one example there is described a method of managing installation of an application on a computing device, comprising: receiving, by an agent on the computing device, a notification in response to a user request to mount a disk image; deciding, by the agent in response to the notification, whether to allow mounting of the disk image and, if so, causing the disk image to be mounted by the computing device; detecting, by the agent, an application bundle within the disk image after mounting; and determining, by the agent in response to detecting the application bundle within the mounted disk image, whether to action installation of the application bundle and, if so, causing the application bundle to be copied to a privileged system location in the computing device, thereby installing the application on the computing device.

In one example, there is described a computing device having a memory and a processor that are configured to perform any of the methods discussed herein.

In one example, a tangible non-transitory computer-readable storage medium is provided having recorded thereon instructions which, when implemented by a computing device, cause the computing device to be arranged as set forth herein and/or which cause the computing device to perform any of the methods as set forth herein.

BRIEF DESCRIPTION OF THE DRAWINGS

For a better understanding of the invention, and to show how example embodiments may be carried into effect, reference will now be made to the accompanying drawings in which.

DETAILED DESCRIPTION

The following description illustrates example embodiments of a mechanism for managing the installation of an application on a computing device. The example mechanism is simple and convenient for a user, and is relatively lightweight to implement. Further, the example mechanism will uphold the security of computing devices while enabling applications to be installed by users themselves and with minimal support or supervision. Many other advantages and improvements will be appreciated from the discussion herein.

The example embodiments are discussed in detail in relation to computing devices using UNIX or Unix-like operating systems, including particularly the 'macOS' family of operating systems (known previously as 'OS X' and before that 'Mac OS X') provided by Apple, Inc. of Cupertino, Calif., USA. As will be familiar to those skilled in the art, Unix-like operating systems include those meeting the Single UNIX Specification ('SUS'), along with similar systems such as implementations of Linux, BSD, and several others. Hence, the teachings, principles, and techniques as discussed below are also applicable in other specific example embodiments. In particular, the described examples are useful in many computing devices having a security model that employs discretionary access control.

Figure 1:
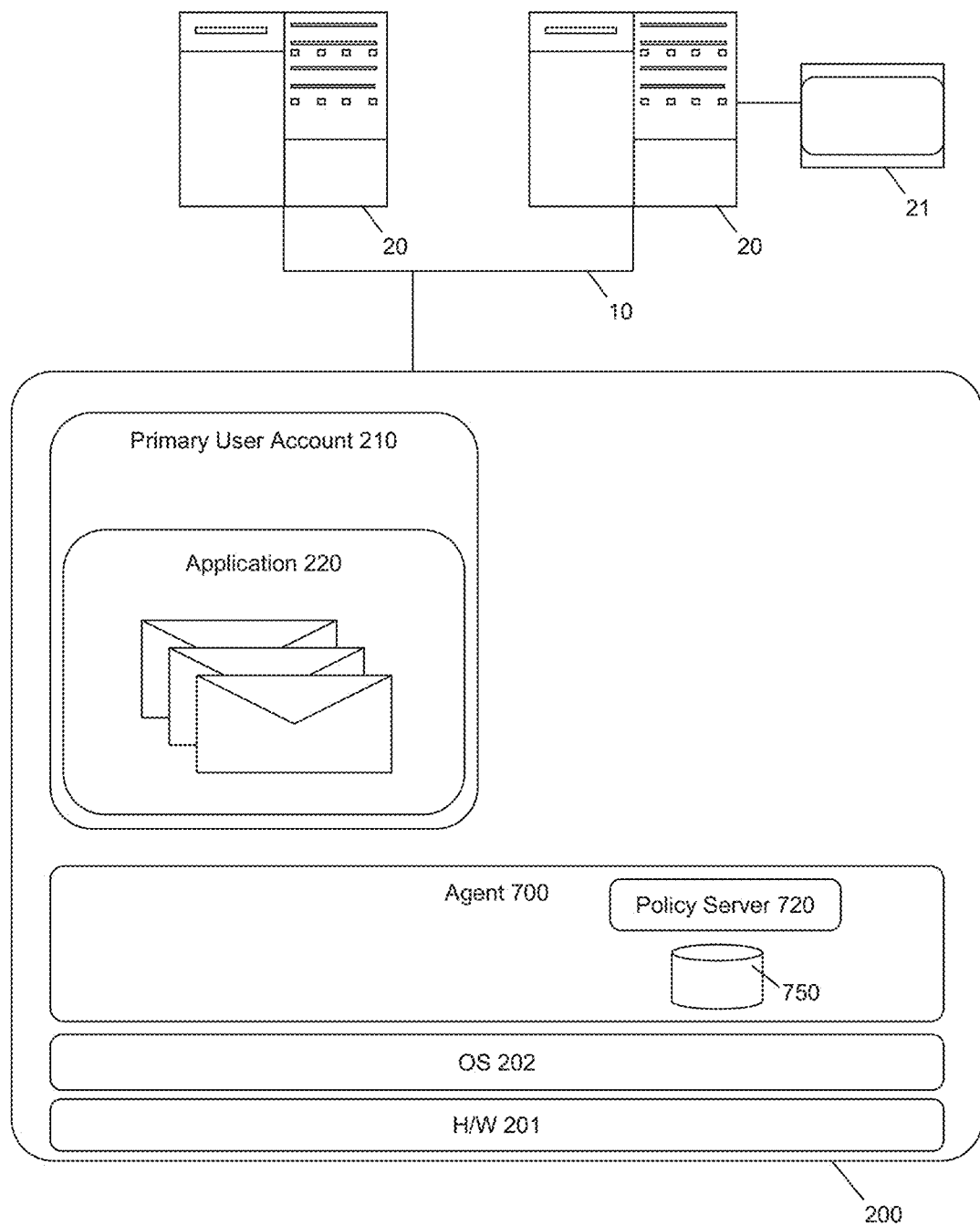
FIG. 1 is a schematic overview of an example computing device as part of a computer network.

FIG. 1 is a schematic overview of a set of computing devices as part of a computer network. In this simplified example, a computing device 200 is coupled by a network 10 to a set of servers 20. For example, the network 10 can be a private network, a virtual private network, an intranet, a cloud, or the Internet. In practice, computing environments for large-scale corporations will typically include many thousands of individual end-user computing devices 200 coupled to many tens or many hundreds of servers 20.

Each end-user computing device 200 may take any suitable form factor. As examples, the device 200 might be a desktop computer, a portable computing device, laptop, tablet, smartphone, wearable device, or an emulated virtual device on any appropriate host hardware. The illustrated computing device 200 comprises a layer of hardware (H/W) 201, which suitably includes memory, processors (CPU central processor units), I/O input/output interfaces (e.g. NIC network interface cards, USB universal serial bus interfaces, etc.), storage (e.g. solid-state non-volatile storage or hard disk drive), and so on. An operating system 202 runs on the hardware layer 201 to provide a runtime environment for execution of user processes and productivity applications 220. This runtime environment typically provides resources such as installed software, system services, drivers, and files. In this illustration, the applications 220 include an email client that is used to send and receive email messages. Of course, many other types of software applications are available and can be provided according to the needs of the user of each particular device.

In this example, the operating system 202 applies a security model wherein access privileges are based on a user account 210. The operating system 202 may define privilege levels appropriate to different classes of users, or groups of users, and then apply the privileges of the relevant class or group to the particular logged-in user (e.g. ordinary user, super-user, local administrator, system administrator, and so on). The user is authenticated such as by logging-in to the computing device 200, e.g. with a user identity and password, and these user credentials may be validated locally or via a remote service such as a domain controller. The current user, via their previously prepared security account, thus acts as a security principal in the security model. The operating system 202 of the computing device 200 then grants appropriate privileges to the processes and applications 220 which execute in the security context of that primary user account 210.

In this example, the computing device 200 further comprises an agent 700. The agent 700 may comprise one or more software and/or hardware modules, such as executables, dynamic libraries (dylib in macOS), plug-ins, add-ins, add-ons or extensions. The agent 700 may operate as a daemon, which runs as a background process on the computing device. Alternately, when considering the Windows family of operating systems, the agent 700 may be a Windows service. The agent 700 is configured to operate in cooperation with the operating system 202 and the client applications 220. In particular, the agent 700 may provide and coordinate core capabilities for the security of the computing device. The agent 700 suitably performs functions for implementing privilege management and application control.

When considering privilege management, it is desirable to implement a least-privilege access security model, whereby each user is granted only a minimal set of access privileges. However, many applications require a relatively high privilege level, such as a local administrator-level, in order to install and operate correctly. Hence, in practice, there is a widespread tendency to grant additional privilege rights, such as the local administrator level, or a system administrator level, to all members of a relevant user group, and thus allow access to almost all of the resources of the computing device. This level of access may be greater than is desirable or appropriate from a security viewpoint. For example, there is a possibility of accidental tampering with the computing device, leading to errors or corruption within the computing device. Further, an infection or malware may access the computing device with the deliberate intention of subverting security or causing damage, such as by encrypting important data content and then demanding a ransom. In this example, the primary user account 210 has a relatively low privilege level. The agent 700 then selectively enables access to higher privilege levels, e.g. a local administrator-level, when needed to perform certain tasks. Conversely, the agent 700 in some examples is also able to downgrade the privilege level, so that certain tasks are carried out at a privilege level lower than that of the current user account 210.

For application control, the agent 700 is arranged to ensure that only authorized applications 220 operate on the computing device 200. For example, the agent 700 is governed by rules based on trusted application types, thereby automatically stopping unapproved applications from running. There may be a sophisticated set of rules which define the conditions under which each application may operate, in relation to the intended host computing device 200 and the relevant user account 210. Thus, in this example, the email client application 220 will only be allowed to operate on the computing device 200 if permitted by the rules as used by the agent 700.

In one example, the agent 700 is coupled to a policy file 750. The policy file 750 stores a set of policies (rules) that define responses of the agent 700 to requested actions or tasks. A policy server 720 may be provided to make policy decisions based on the policy file 750. The policy server 720 may operate by receiving a policy request message, concerning a requested action and related meta-information, and returning a policy result based thereon. In one example, the agent 700 is configured to capture a set of identities, and may then provide these identities as part of the policy request. Such identities may include a user identity (UID) of the relevant user account, a group identity (GID) of a group to which that user account belongs, a process identity (PID) of a current process which has initiated the action or task in question, and/or a process identity of a parent process (PPID). Suitably, the policy server 720 determines an outcome for the request based on the provided set of identities relevant to the current policy request.

In one example, the policy file 750 is a structured file, such as an extensible mark-up language XML file. The policy file 750 is suitably held locally on the host device 200, ideally in a secure system location that is accessible to the agent 700 but which is not accessible by the user account 210. Updates to the policy file 750 may be generated elsewhere on the network 10, such as by using a management console 21 on one of the servers 20, and then pushed, or pulled, to each instance of the agent 700 on each device 200. The policy file 750 is readily updated and maintained, ensuring consistency for all devices across the network. In this way, the agent 700 is robust and manageable for a large-scale organization with many thousands of individual computing devices 200. Also, the agent 700 is able to leverage rules which have been developed in relation to application control, such as defining user groups or user roles and related application permissions, and now extend those same rules also to privilege management, and vice versa.

In some examples, the agent 700 is configured to perform custom messaging. In particular, agent 700, whether acting directly or via a cooperating proxy or plugin, may present a message dialog to the user. This message dialog may be presented in a terminal from which a current action of interest was invoked by or on behalf of the user. Thus, the custom messaging may be presented on a display of the computing device 200 for interaction with the user. Input from the user may be returned to the agent 700 for evaluation. Hence, the agent 700 is able to interact with the user with a rich set of customizable messages.

In one example, the custom messaging may include at least one of a confirmation, a challenge-response, and a reason. In more detail, the confirmation may present a dialog which receives a binary yes/no type response, allowing the user to confirm that they do indeed wish to proceed and providing an opportunity to double-check the intended action. The custom messaging conveniently allows specific text, e.g. as set by the policy file 750, to be included in the dialog, such as reminding the user that their request will be logged and audited. As another option, the custom messaging may provide specific block messages, explaining to the user why their request has been blocked, thus enabling improved interaction with the user.

In one example, the custom messaging may require additional authentication to be presented by the user in order to proceed with the requested action. As an example, the additional authentication may require the user to again enter their username and password credentials, or may involve one or more of the many other forms of authentication (e.g. a biometric fingerprint or retinal scan) as will be appreciated by those skilled in the art. The challenge-response also allows alternate forms of authentication to be employed, such as two-factor authentication. In one example, the challenge-response requires entry of a validation code, which might be provided such as from a second device or an IT helpdesk.

In one example, the reason allows the user to provide feedback concerning the motivation for their request, e.g. by selecting amongst menu choices or entering free text. Logging the reasons from a large set of users allows the system to be administered more efficiently in the future, such as by setting additional rules in the policy file 750 to meet the evolving needs of a large user population.

Notably, custom messaging allows the agent 700 to provide a rich and informative set of interactions with the users. Each of these individual custom messaging actions may be defined in the policy file 750. The custom messaging may eventually result in a decision to allow or block the requested action. An appropriate allow or block operation is then carried out as required.

The agent 700 may perform auditing in relation to all requests or at least certain requests. The auditing may include recording the customized messaging, and may include recording an outcome of the request. Audit reports may be extracted or uploaded from each end-user device 200 such as to the management console 21 on the servers 20 at any suitable frequency. Each of these auditing functions may be defined in the policy 750.

In some examples, the agent 700 is configured to perform passive handling of a request. In this case, the request is presented to the originally intended recipient, typically within the operating system 202, and any responses may be returned transparently. In one example, passive handling is defined by the policy file 750. The agent 700 can meanwhile audit the requests which were handled passively, again consistent with the policy file 750. Notably, this passive handling function allows the action to proceed while the requesting user process or application is unaware of the agent 700 as an intermediary. Advantageously, the default behavior of the system is maintained for those actions that the agent 700 determines should have passive handling. Also, there is now a fail-safe option, in that the system will maintain an expected behavior for actions that are passively handled. This passive handling is useful particularly in the event that a particular user or request is not specified in the policy file 750 because the default behavior is still enacted. Hence, the system can now quickly and safely supersede the original behavior for specific situations, allowing rapid responses and network-wide consistency when needed, while still enabling existing legacy functionality and behavior to continue in place for other actions, users and/or devices, as appropriate.

Installing Applications

Figure 2:
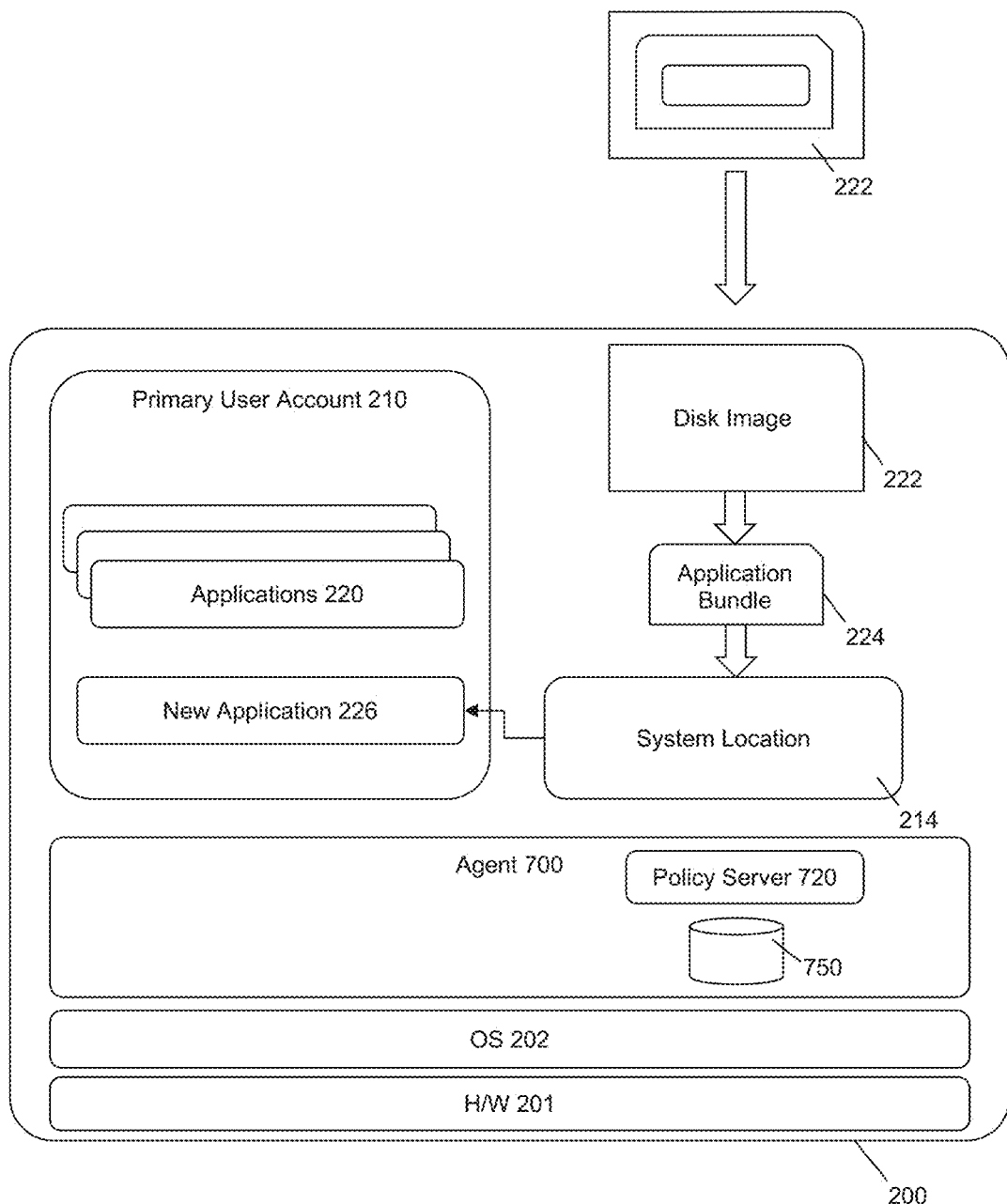
FIG. 2 is a schematic view of the example computing device in operation.

FIG. 2 shows the computing device 200 in more detail in relation to an example mechanism for installing a particular new application 226, alongside a set of one or more existing applications 220. The agent 700 is configured to receive a notification from the operating system 202 in response to a user request to mount a disk image 222. In response to this notification, the agent 700 determines whether or not to allow mounting of the disk image 222 and, if so, the agent 700 causes the disk image 222 to be mounted by the operating system 202. The agent 700 now examines the mounted disk image 222 to detect an application bundle 224. The agent 700 determines whether or not to proceed with installation of the application bundle 224 and, if so, then causes the application bundle 224 to be copied to a privileged system location 214.

The application bundle 224 contains the resources that are required in order for the application 226 to execute on the computing device 200, using the runtime environment provided by the operating system 202. In one example, the application bundle 224 is a folder (file directory), which allows a plurality of related files to be grouped together. The resources within the application bundle 224 include the executable code relevant to the application 226. The application bundle 224 conveniently has a defined structure and is typically identified by a relevant file extension (e.g. '.app' for macOS). In one example, the application bundle 224 is a package as an abstraction that is displayed graphically to the user as a single file or entity, but which actually contains a hierarchy of files or objects.

Typically, the application bundle 224 is deployed to the computing device 200 by way of the disk image 222. The disk image 222 is a file representing the structure and contents of a storage device, similar to a physical storage device such as a hard disk drive, optical disk (DVD) or solid-state storage (USB flash drive). When such a physical storage device is coupled to the computer 200, then the device is mounted by the operating system 202 to become available to other components within the computing device 200. That is, plugging in a USB flash storage causes that device to be mounted. Similarly, a user can initiate mounting of a disk image 222, for example after downloading the disk image 222 over the network 10. Typically, the disk image 222 is identified with a '.dmg' file extension.

The agent 700 may register with the OS 202 to receive the notification concerning mounting of the disk image 222. Suitably, the agent 700 registers with the OS 202 on boot-up. In one example, considering the 'macOS' family of operating systems, registration may be accomplished using a 'DiscArbitration' framework which provides a framework for arbitration of disk operations. Hence, the agent 700 is sent the notification when, at some time subsequently, the OS 202 encounters a user request for mounting of the disk image 222.

The agent 700 suitably captures meta-data related to the disk image 222, which may include any one or more of: a file name of the disk image, a hash of the disk image and a signature. In some examples, the disk image 222 can be signed, e.g. using a code signing identity, to reliably establish an identity of the author or source of the disk image and content therein. Other metadata may also be used, such as a current path where the disk image 22 is located, and information relevant to the current session (UID, etc.) and the current computing device (host machine details).

As noted above, this meta-information allows the agent 700, appropriately via the policy server 720 and the policy file 750, to determine whether or not to proceed with mounting of the disk image 222. If so, the agent causes the disk image 222 to be mounted, by the operating system 202, or else blocks the mount. As discussed above, custom messaging may be employed by the agent 700 to obtain additional information of interest in relation to the mounting decision. Also, the custom messaging can be used to notify the user of a reason for blocking the mount.

Once mounted, the agent 700 suitably examines the contents of the disk image 222. If an application bundle 224 is found to be contained in the mounted disk image, then the agent 700 determines an appropriate action. Again, the agent 700 may gather appropriate meta-data relating to the identified application bundle 224, such as a signature, the identified current user, machine, etc. In some examples, the operating system may provide API function calls which return the desired information, such as Bundle Name, Bundle Creator, Bundle Type, Version, Bundle Executable. Also, if the bundle is signed, then these functions may also allow the certificate and hash to be retrieved. Alternatively, the agent 700 may itself generate a hash of the content of the bundle, which can then be matched against records in the policy file 750 of hashes for known and trusted bundles. For example, third-party functions such as QCryptographicHash allow a hash to be generated by the agent 700, suitably by integrating through all files in the bundle. Also, the agent 700 may employ custom messaging to obtain additional information, or provide additional information, in relation to the identified application bundle 224, prior to determining whether or not to proceed. For example, the agent 700 may prompt the user to confirm that they wish to proceed with installing the identified application bundle 224 from the disk image 222.

If installation of the application bundle 224 is approved, the agent 700 now initiates the process of copying the application bundle 224 into a privileged system location 214. In one example, applications are intended to reside in the system folder '/Applications' in macOS. Copying the application bundle 224 into this system location 214 requires privileges associated with the administrator group. If the current user, through their user account 210, is a member of the administrator group then the copy can be performed by the user themselves, such as through a drag and drop operation. However, it is desirable for the current user account not to be a member of the administrator group, consistent with the least privilege principle. That is, the current user account 210 is excluded from a privilege level which is required in order for the copy operation to be permitted by the operating system 202. Hence, the user themselves will be denied the action of copying the application bundle 224 to the applications folder as a privileged system location 214. However, the agent 700 has appropriate (higher) privileges and thus is able to cause the copy operation to be successfully performed by the operating system 202. In some examples, the agent 700 is able to use file copy functions that are provided natively by the operating system 202 (e.g. NSFileManager in macOS including NSFileManager copyItemAtPath: toPath: error:), or appropriate third-party functions (e.g. Qt's QFile::copy). Hence, with this mechanism, standard users are now able to cause a desired application 226 to be installed, by copying the application bundle 224 to the relevant system location 214, with assistance from the agent 700. When the application bundle 224 has been copied to the appropriate system location 214, the application 226 is now installed and is available to be executed by the user when desired.

In some examples, the disk image 222 may include a short-cut to the relevant privileged system location 214 (typically the /Applications folder). Hence, the agent 700 may extract this short-cut from the content of the disk image 222 and apply the specified location when performing the copy operation.

Figure 3:
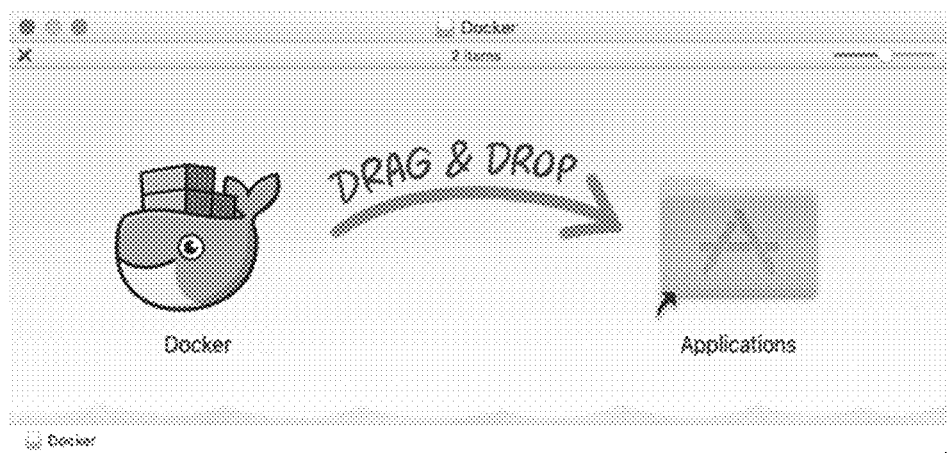
FIG. 3 is a schematic view of the example computing device in more detail.

FIG. 3 is a screenshot as an example of a user interface as would ordinarily be provided to the user for them to manually drag and drop an application bundle into a privileged system location. In this illustrative example, the disk image contains an application bundle for the application 'docker', and is to be copied to the '/Applications' folder. Notably, the drag and drop operation, if attempted by the user not having sufficient privileges, would be denied by the operating system. However, by the mechanism described above, the agent 700 now enables the desired application to be installed.

As a further refinement, the agent 700 may identify that matching application bundle already exists in the target system folder and, in response, may prompt the user to confirm that they wish to overwrite the current application bundle. Again, APIs in the operating system 202 may be employed, such as NSFileManager fileExistsAtPath: on macOS. This overwrite function can be controlled by the agent 700 with reference to the policy file 750, including further custom messaging as appropriate.

Figure 4:
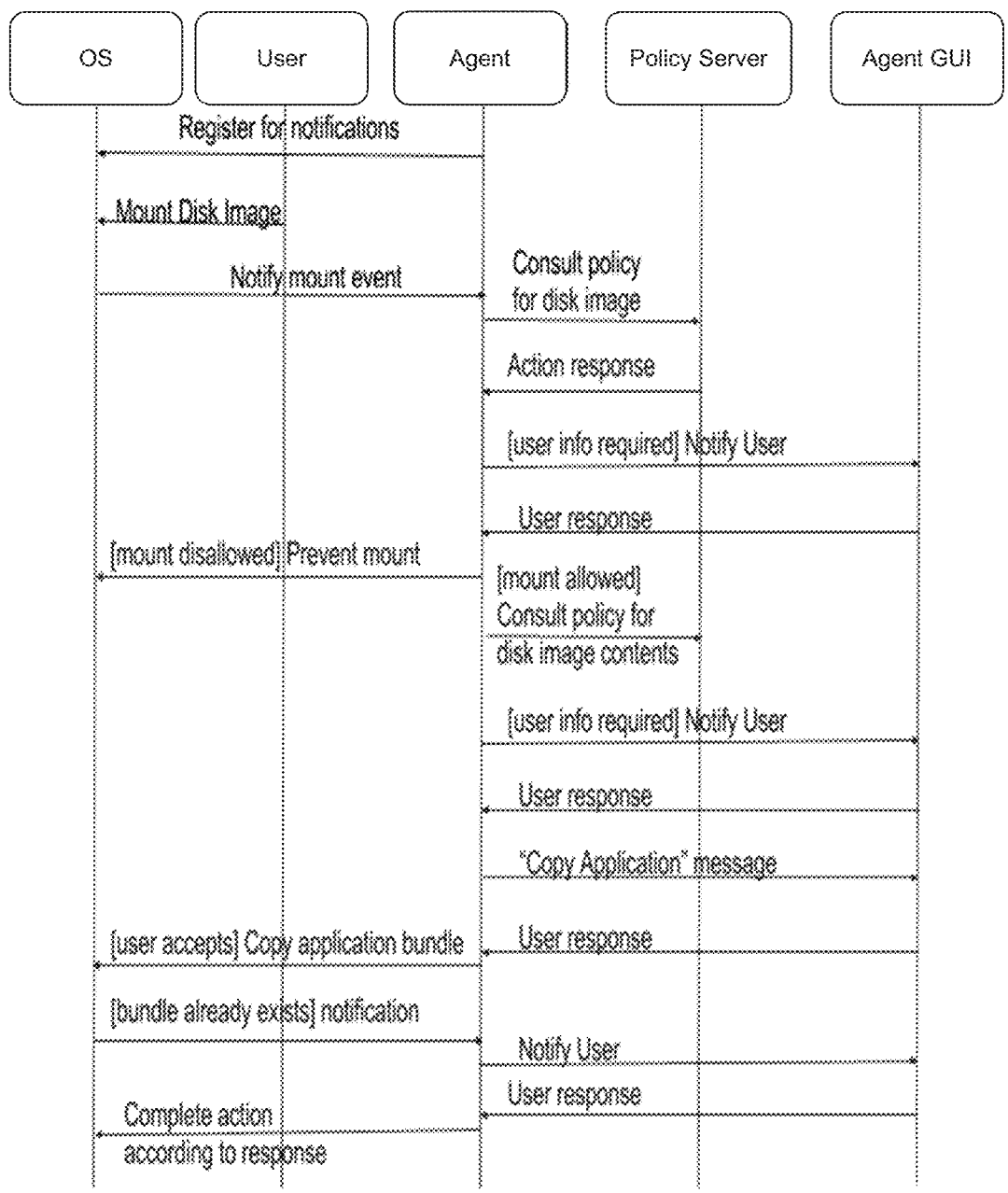
FIG. 4 is a schematic view of the example computing device in more detail.

FIG. 4 is a swim-lane diagram that illustrates the event sequence and example interactions of the agent 700 with the user and the operating system, consistent with the discussion already set out above. In this detailed example, when the agent daemon of the agent 700 is started (usually at boot), it requests notifications from the OS 202 (e.g. macOS) of whenever disk images have requested to be mounted. At some later point in time, the user requests to mount a disk image 222, which causes the agent 700 to be notified by the OS 202.

The agent 700 consults its policy server 720 for the action to take, based on matching criteria of the disk image 222 and/or its contents and filters such as the current session user, machine details, and so on. According to the policy, the mounting of the disk image 222 may be blocked by the agent 700 and the user notified of the reason. Again according to the policy, the user may be prompted for information, such as, but not limited to, the reason for why they want to mount the disk image; a challenge-response code; authorization credentials; etc. The agent 700 verifies the user's response and if valid, allows mounting of the disk image 222. On examination of the contents of the disk image 222, the agent 700 may take further actions. If an application bundle 224 is contained in the mounted disk image 222, the policy server 720 is again consulted for action. According to the policy, the user may be prompted for additional information, such as, but not limited to, the reason for why they want to copy the application 226 residing in the mounted disk Image 222; a challenge-response code; authorization credentials; etc. According to policy, if the copy is permitted, the agent 700 may prompt the user if they wish to copy the application bundle 224 from the disk image 222 to a system location 214, such as the /Applications folder. If the user approves the copy, the agent 700 will initiate the process of copying the application bundle 224 for the user. If a matching application bundle already exists in the target folder, the agent may prompt the user if they wish to overwrite the current application bundle, according to policy. Also, according to policy, all events occurring during this process, including user responses to prompts for information, may be audited by the agent 700.

Figure 5:
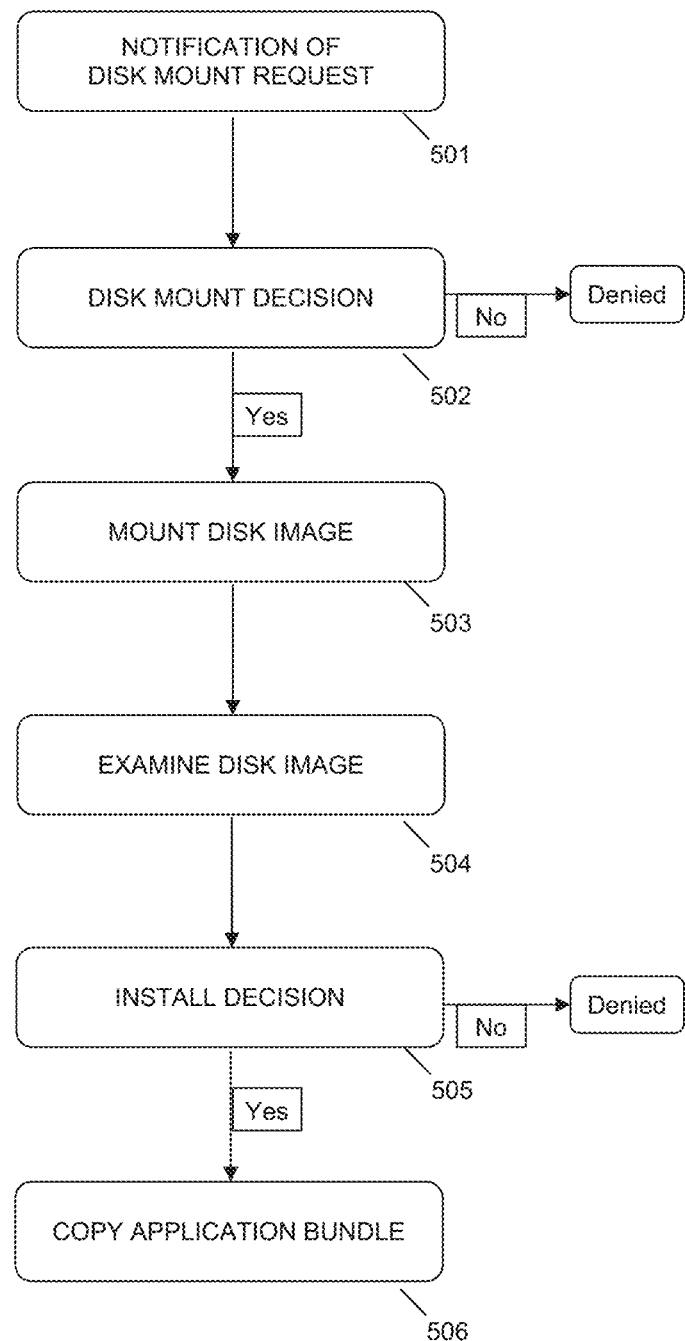
FIG. 5 is a flowchart of an example method of operating the computing device.

FIG. 5 is a flow diagram illustrating an example method of installing an application on a computing device, again consistent with the discussion above. At step 501, the agent 700 on the computer system 200 receives a notification, in response to a user request to mount a disk image 222. At step 502, the agent 700 determines whether or not to allow mounting of the disk image 222, and, if so, causes the disk image 222 to be mounted, as at step 503. The agent 700 examines the mounted disk image at step 504 to detect the application bundle 224. If installation of the identified application bundle 224 is to be actioned then, as at step 506, the agent 700 causes the application bundle 224 to be copied from the mounted disk image 222 to a relevant privileged location 214 in the computer system (such as the '/Applications' folder). The application 226 is thus installed and is now ready to be used. This process may be repeated as often as needed for each new application that is to be installed, and at any convenient time over the lifespan of the computing device.

The example mechanism has many benefits and advantages, as will now be appreciated from the discussion herein. In particular, installation of an application for each computing device in the network is managed more efficiently and with enhanced functionality. Application control typically determines whether or not to allow execution of an installed application, whereas the present mechanism takes control further upstream including the initial action of mounting the disk image. Thus, the mechanism better avoids downstream problems, such as mounting unauthorized disk images. Resultant issues are also addressed, such as unnecessary consumption of storage space on the computing device by mounting of disk images containing unauthorized applications.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processor circuits. These functional elements may in some embodiments include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables.

Although the example embodiments have been described with reference to the components, modules, and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" may mean including the component(s) specified but is not intended to exclude the presence of other components.

Although a few example embodiments have been shown and described, it will be appreciated by those skilled in the art that various changes and modifications might be made without departing from the scope of the invention, as defined in the appended claims.

What is claimed is:

1. A system, comprising:
a memory device; and
at least one computing device comprising a processor in communication with the memory device, the at least one computing device being configured to manage installation of an application program on the at least one computing device via an agent registered with an operating system of the at least one computing device, wherein the at least one computing device is configured to:
receive a notification in response to a user request to mount a disk image comprising the application program;
generate a challenge-response to authenticate a current user;
determine an action to take based on a response to the challenge-response; and
install the application program using privileges of the agent without changing privileges of an account of the current user.

2. The system of claim 1, wherein authenticating the current user comprises performing a biometric verification.

3. The system of claim 1, wherein the at least one computing device is further configured to obtain additional information necessary to determine the action to take via the challenge-response.

4. The system of claim 1, wherein the at least one computing device is further configured to determine the action to take further based on metadata associated with the disk image.

5. The system of claim 4, wherein the at least one computing device is further configured to consult a policy file to determine the action to take based on the meta-data associated with the disk image.

6. The system of claim 4, wherein the metadata comprises at least one of a current path of the disk image and current session information.

7. A method, comprising:
- receiving, via an agent of at least one computing device, a notification in response to a user request to mount a disk image comprising an application program;
- generating, via the agent of the at least one computing device, a challenge-response to authenticate a current user;
- determining, via the agent of the at least one computing device, an action to take based on the challenge-response; and
- installing, via the agent of the at least one computing device, the application program according to the action to take using privileges of the agent without changing privileges of a user account.

8. The method of claim 7, further comprising capturing metadata related to the disk image, wherein the action to take is further based on the meta-data.

9. The method of claim 7, further comprising providing the challenge-response to the current user.

10. The method of claim 9, wherein providing the challenge-response to the current user comprises:
- rendering a challenge to the current user via a dialog; and
- receiving a response from the challenge-response via the dialog.

11. The method of claim 7, wherein a response to the challenge-response comprises a reason for the user request.

12. The method of claim 7, wherein the challenge-response to authenticate the current user is generated based on a policy.

13. The method of claim 7, wherein the challenge-response comprises two-factor authentication.

14. A non-transitory computer-readable medium embodying an agent that, when executed by at least one computing device, causes the at least one computing device to:
- receive a notification in response to a user request to mount a disk image comprising an application program;
- consult a policy file to determine an action to take based on a challenge-response from a current user; and
- based on the action to take, install the application program using privileges of the agent without changing privileges of an account of the current user.

15. The non-transitory computer-readable medium of claim 14, wherein the policy file comprises a plurality of rules defining conditions under which the agent operates.

16. The non-transitory computer-readable medium of claim 14, wherein the policy file is stored in a secure location on a policy server.

17. The non-transitory computer-readable medium of claim 14, wherein the agent further causes the at least one computing device to generate the challenge-response to authenticate the current user.

18. The non-transitory computer-readable medium of claim 14, wherein the agent further causes the at least one computing device to receive a validation code to authenticate the current user via the challenge-response.

19. The non-transitory computer-readable medium of claim 18, wherein the validation code is provided to the current user via a second computing device.

20. The non-transitory computer-readable medium of claim 18, wherein the agent further causes the at least one computing device to generate a dialog comprising a binary response, wherein the action to take is further based on the binary response.

* * * * *